United States Patent
Davis

(10) Patent No.: US 6,694,667 B2
(45) Date of Patent: Feb. 24, 2004

(54) METHOD AND APPARATUS FOR DISPENSING FILAMENT SUCH AS TIPPET FISHING LINE

(76) Inventor: Scott B. Davis, 235 E. 1200 South, Bountiful, UT (US) 84010

( * ) Notice: Subject to any disclaimer, the term of this patent is extended or adjusted under 35 U.S.C. 154(b) by 0 days.

(21) Appl. No.: 09/934,882

(22) Filed: Aug. 22, 2001

(65) Prior Publication Data

US 2003/0037480 A1 Feb. 27, 2003

(51) Int. Cl.⁷ ............................................. A01K 97/06
(52) U.S. Cl. .................. 43/54.1; 242/137.1; 242/588.6; 225/47; 225/90
(58) Field of Search ............................ 43/54.1; D6/518; 132/321; 206/315.11; 242/588.6, 588.3, 129, 137.1; 225/46, 47, 90

(56) References Cited

U.S. PATENT DOCUMENTS

| | | | | |
|---|---|---|---|---|
| 1,070,611 A | * | 8/1913 | Jones | 242/137 |
| 2,226,430 A | * | 12/1940 | Handzelek | 242/137.1 |
| 2,452,299 A | * | 10/1948 | Gould | 225/47 |
| 2,630,981 A | * | 3/1953 | Strocco | 242/137.1 |
| 2,875,963 A | * | 3/1959 | Collins | 225/44 |
| 2,929,541 A | * | 3/1960 | Castelli et al. | 225/44 |
| 3,490,169 A | * | 1/1970 | Tweed | 206/315.11 |
| 4,026,063 A | * | 5/1977 | Allen et al. | 43/54.1 |
| 4,141,479 A | * | 2/1979 | Dennison | 242/137.1 |
| 4,290,223 A | * | 9/1981 | Ostenberg et al. | 43/54.1 |
| 4,475,699 A | * | 10/1984 | Calvin | 242/137.1 |
| 4,528,772 A | | 7/1985 | Schaefers | 43/54.1 |
| 4,583,315 A | | 4/1986 | Schreck | 43/54.1 |
| 4,942,691 A | | 7/1990 | Hwang | 43/54.1 |
| 4,958,730 A | * | 9/1990 | Bunten | 206/315.11 |
| 5,160,077 A | * | 11/1992 | Sticklin | 225/47 |
| 5,282,563 A | * | 2/1994 | Oliver et al. | 225/47 |
| 5,371,968 A | * | 12/1994 | Casey | 43/54.1 |
| D367,575 S | * | 3/1996 | Thompson | D6/518 |
| 5,657,573 A | * | 8/1997 | Fischer et al. | 43/54.1 |
| 5,738,297 A | * | 4/1998 | Bailey et al. | 43/54.1 |
| 5,915,947 A | | 6/1999 | Tomlinson | 43/54.1 |
| 6,295,997 B1 | * | 10/2001 | Dickie | 132/321 |
| 6,302,121 B1 | * | 10/2001 | McConnell | 132/321 |

FOREIGN PATENT DOCUMENTS

JP 8-89149 B1 * 4/1996

* cited by examiner

*Primary Examiner*—Darren W. Ark
(74) *Attorney, Agent, or Firm*—Knobbe, Martens, Olson & Bear LLP

(57) ABSTRACT

Disclosed is a storage container enclosing a plurality of spools for receiving filament such a fishing tippet line. The spools are positioned adjacent to each other on separate shafts and rotate independently. Each spool may be removed from its shaft in the container, and a length of tippet line may be conveniently wound around each spool outside of the container. The spools are then returned to their respective shafts in the container. The free end of each spooled tippet line is threaded through an access hole in the side of the container and extends across the outside of the storage container to a structure that conveniently holds and cuts the tippet line. A desired length of tippet line may be withdrawn through the access hole and cut. The storage container is preferably relatively thin and compact. It may be small enough to fit within an average-sized pocket in a fisher's clothing. When the lid of the storage container is closed, the lines on the spools are protected from tangling and unwinding.

6 Claims, 8 Drawing Sheets

METHOD AND APPARATUS FOR DISPENSING FILAMENT SUCH AS TIPPET FISHING LINE

BACKGROUND OF THE INVENTION

1. Field of the Invention

The present invention relates generally to containers or dispensers for filament, and more specifically to a method and apparatus for dispensing tippet fishing line for fly fishing.

2. Description of the Related Art

The most common method of containing and dispensing filament (such as string, thread, rope, cord, etc.) is to wind the filament around a spool until it is needed, and then unwind and cut off a desired length of the filament from the spool. It is advantageous in certain applications of the filament to provide a container or dispenser to protect the filament from damage or entanglement. In particular, the demands of fly fishing make containers or dispensers for fishing line especially helpful.

The fishing line used in fly fishing is generally comprised of four main parts: the backing, the main line, the leader, and the tippet. The individual parts of the fishing line are attached end-to-end using knots or fasteners. The first end of the backing is attached to a reel positioned near the base of the fishing rod, and the second end of the backing is attached to the main line. During normal use, the full length of the backing and most of the main line are wound around the reel. Only rarely does the fishing line extend away from the fishing rod far enough to unwind the backing from the reel, such as when an exceptionally strong fish takes the hook and swims a long distance away from the fisher, causing the entire main line to unwind from the reel.

The main line is generally much longer than the leader and the tippet. The end of the main line opposite from the backing is removably connected to the leader. The other end of the leader, in turn, is removably connected to the tippet, and a fly is removably attached to the free end of the tippet.

During fly fishing, a fisher grasps the end of the rod near the reel and whips it rapidly back and forth to cast the line and cause the fly to touch or glide across the surface of the water in a manner which mimics the natural path of travel of an insect, which, in turn, attracts fish. The components of the fishing line each come in various weights and diameters. The physical relationship among these components is critical in helping the fisher to deal with a wide variety of environmental conditions, such as the speed and direction of the wind and water, the clarity of the water, the size and speed of the fish, and the size of the body of water in which the fisher is casting his or her line. The configuration of the fishing line helps the fisher achieve the proper insect-like presentation with various flies of different sizes, shapes, and weights.

The tippet moves and stretches more than the rest of the line, and it also comes in contact with other objects (such as rocks, plants, and water) more often than the rest of the line. The tippet therefore wears out much more quickly. Thus, even if a fisher does not customarily change his or her tippet to match specific fishing conditions, it may still be necessary to periodically remove the tippet from the rest of the line to replace it.

Ideally, the four components of the fishing line should be selected such that the diameter of the leader is smaller than the diameter of the main line, and the diameter of the tippet is smaller than the diameter of the leader. When the line is fully extended during the waving motion of the rod, the tippet needs to stretch out to its full length and support the fly with appropriate resilience. The fisher must therefore give careful consideration to the size, weight, and aerodynamic properties of the fly in choosing the proper tippet weight and diameter. If the tippet line is too small, it will not properly support the fly, and its direction and motion will be difficult to control. If the tippet line is too large, it will not fully extend or properly uncurl during the motion of the rod. A fisher often needs to experiment with many different sizes of tippets while fishing until he or she finds success with a particular combination.

On occasion, a fisher may also want to tie more than one fly to the end of a fishing line to create the impression that many insects are landing on the surface of the water and thereby further provoke the fish. A small length of tippet line is sometimes used to connect these flies to each other and to the end of the fishing line.

Thus, it is desirable for fishers to carry many different tippets of varying weights and diameters to properly account for environmental conditions, the type of fly used, and for other special purposes. However, a fisher must usually also bring many other fishing implements and hence his or her carrying capacity is very limited. Moreover, fishers sometimes need to hike long distances to reach a good fishing spot, and it is therefore highly desirable to limit the amount of equipment carried. Accordingly, there is a need for methods and device for carrying a variety of tippet lines in a small amount of space.

There is also a need for methods and devices for conveniently obtaining the desired length of tippet line. Fishers usually purchase long lengths of tippet line in spools, but only a short length of the tippet is necessary for a particular use. The desired length of tippet must be drawn off of the spool and cut from the rest of the line. Some fishers use scissors, clippers, or a knife to cut the tippet line, but this requires the fisher to locate the cutting implement and hold the rod, the tippet spool, and the cutting implement while cutting the tippet line. The selection and attachment of the tippet must usually be accomplished in a very short amount of time so that the fisher can attract a fish that is swimming nearby or a fish that is hiding among the rocks and only comes out during brief intervals. This process of tippet cutting is particularly awkward when a fisher is standing in a precarious spot near, or even in, the water. Under these circumstances, the risk of dropping a fishing implement into the water is significant.

The prior art attempts to carry and access a fisher's assortment of tippets have many shortcomings. For example, U.S. Pat. No. 4,528,772 to Schaefers, discloses a "tippet tube." Various color-coded lengths of tippet pass through, and are kept together by, a length of tube. The tippet bundle extends out of the tube on each end, and a plastic plug is inserted into one end of the tube to press the tippet bundle against the wall of the tube and maintain it in place. But the Schaefer tippet tube is long and unwieldy, and requires carrying a separate tool to cut the tippet to the desired length.

Another fishing line dispenser is disclosed in U.S. Pat. No. 4,583,315 to Schreck. This device has a series of concentric, nested circles. A length of fishing line is wound in the space between each adjacent pair of circles, and a single cutter in the central hub is used to clip a given line to a desired length. The circles do not rotate so the fisher must wind the line off in a circular motion, rather than pulling it out in a straight line. The unwinding action required to withdraw the tippet makes it time-consuming and cumbersome to obtain the desired length of tippet line, especially under the demanding conditions of fly fishing. Another disadvantage to the Schreck dispenser is that the spaces between the outer circles hold significantly more tippet line than the spaces between the inner circles. Thus, a fisher must predict in advance which type of tippet he or she will be using most often and wrap it around the outer circles.

In U.S. Pat. No. 5,915,947 to Tomlinson, a series of co-axially aligned spools are attached to a bracket that pins onto the fisher's clothing. Tippet line is wound around each of the spools. The end of each strand of tippet is held in place by a common clamp that is positioned in front of the spools. The Tomlinson dispenser exposes the tippet to branches, leaves, and anything else that may contact the clothing of the fisher, causing the tippet to unwind and tangle.

Thus, there is a need for a device and method for storing and dispensing tippet in a compact and convenient manner, while protecting the tippet from unwinding and tangling. In addition, fishers need to be able to easily access the desired tippet and quickly and easily cut it to a given length.

SUMMARY OF THE INVENTION

In a preferred embodiment of the present invention, a storage container with a lid encloses a plurality of spools for receiving filaments such as fishing tippet lines. The spools are positioned adjacent to each other on separate shafts and rotate independently. Each spool may be removed from its shaft in the container, and a length of tippet line may be conveniently wound around each spool outside of the container. The spools are then returned to their respective shafts in the container.

The free end of each spooled tippet line is threaded through an independent access hole in the side of the container and extends along the outside of the storage container to a structure that conveniently holds and cuts the tippet line. A desired length of tippet line may be withdrawn through the access hole and clipped from the rest of the tippet spool by the cutter.

Because the spools are positioned adjacent to each other, the storage container may be rather thin and compact. It may be small enough to fit within an average-sized pocket in a fisher's clothing. When the lid of the storage container is closed, the spools are protected from tangling and unwinding, but are easily accessed for refilling.

DETAILED DESCRIPTION OF THE PREFERRED EMBODIMENTS

Figure 1:
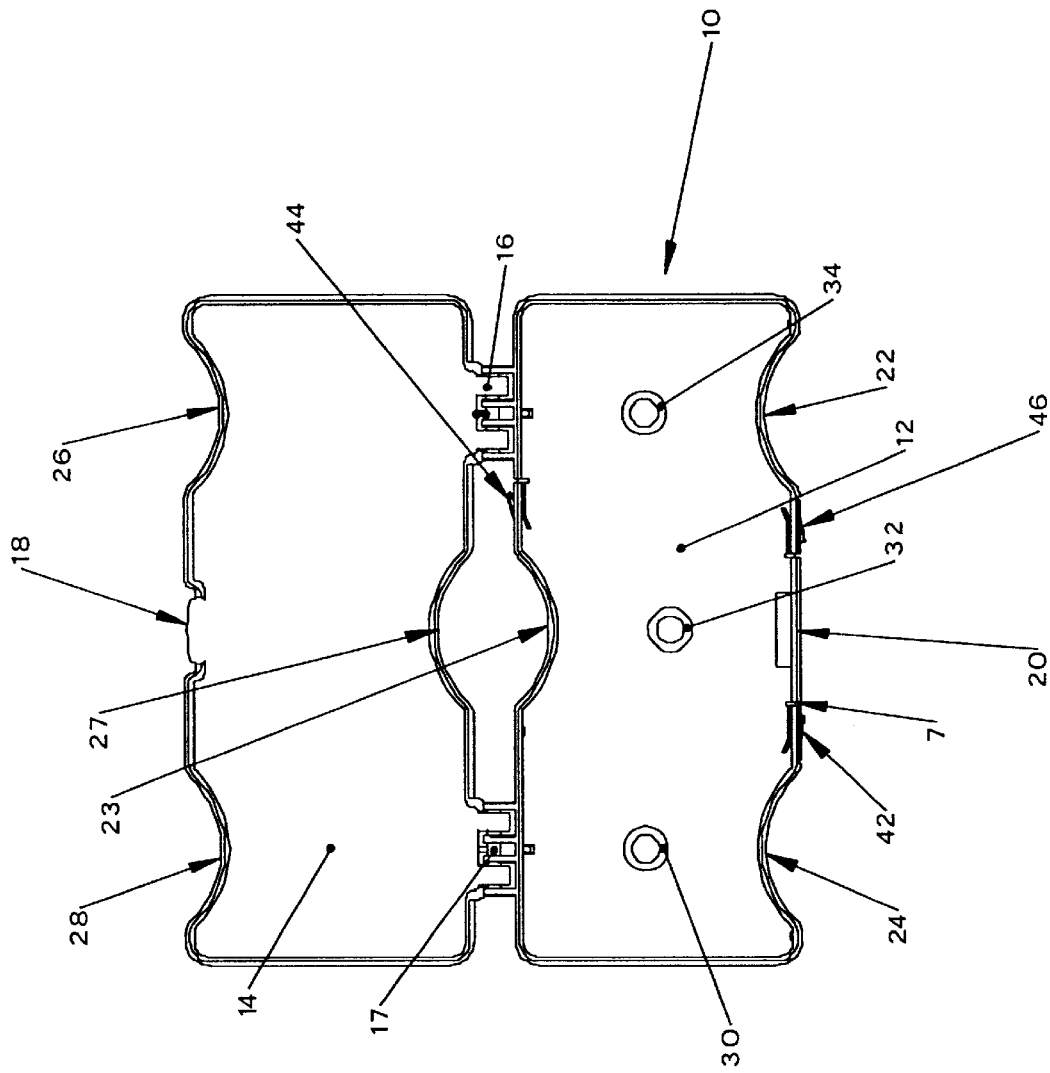
FIG. 1 is a top plan view of a preferred embodiment of the filament storage container with the lid opened and without any spools.
Figure 2:
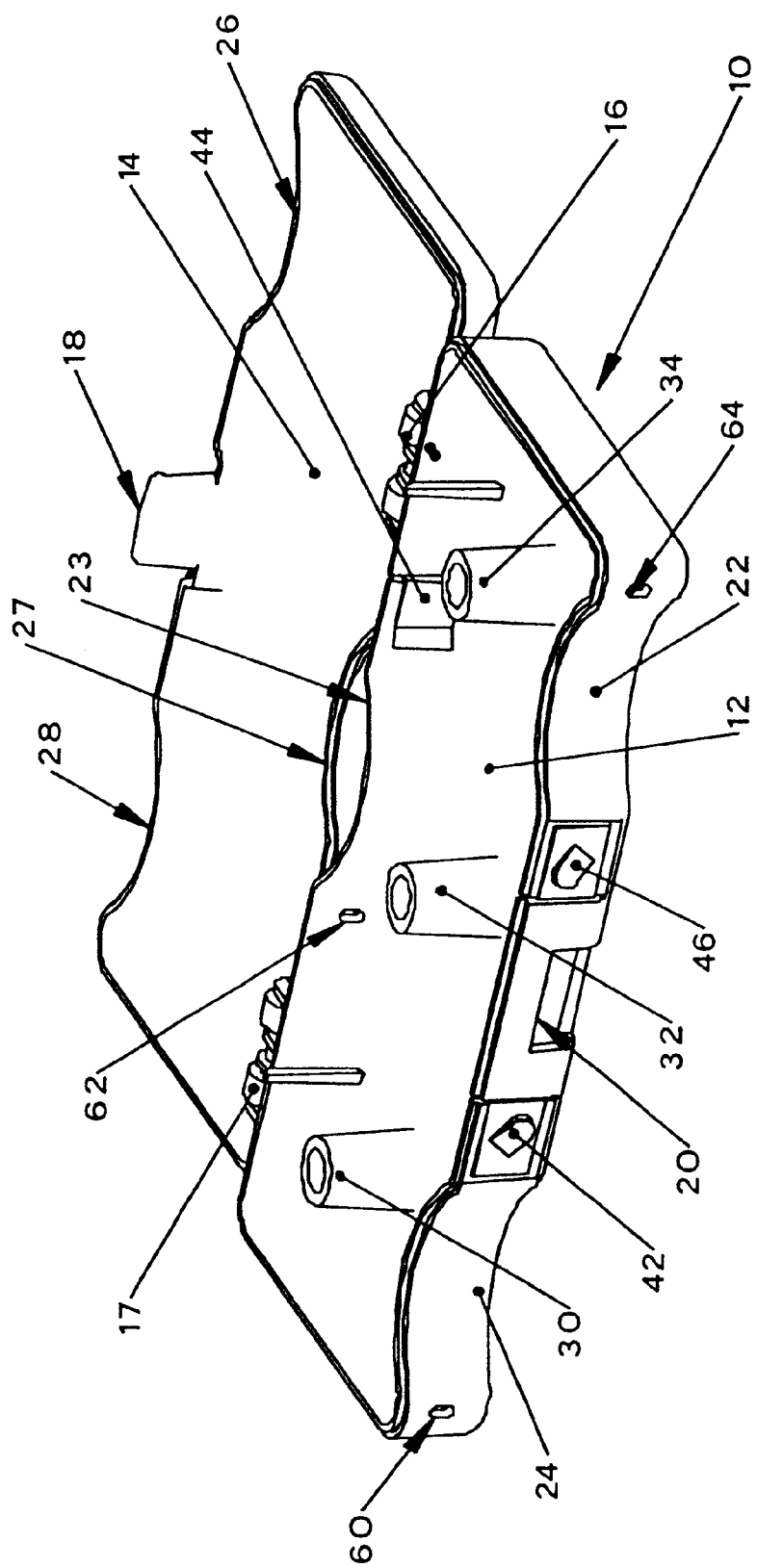
FIG. 2 is a front perspective view of the container of FIG. 1.

FIGS. 1 and 2 illustrate the container 10 of a preferred embodiment of the present invention in an open configuration. To achieve high durability and low weight, the container 10 is preferably made of plastic, but other materials may also be used. The container 10 comprises two parts, a base 12 and a lid 14, which are preferably connected by two hinges 16, 17.

Figure 4:
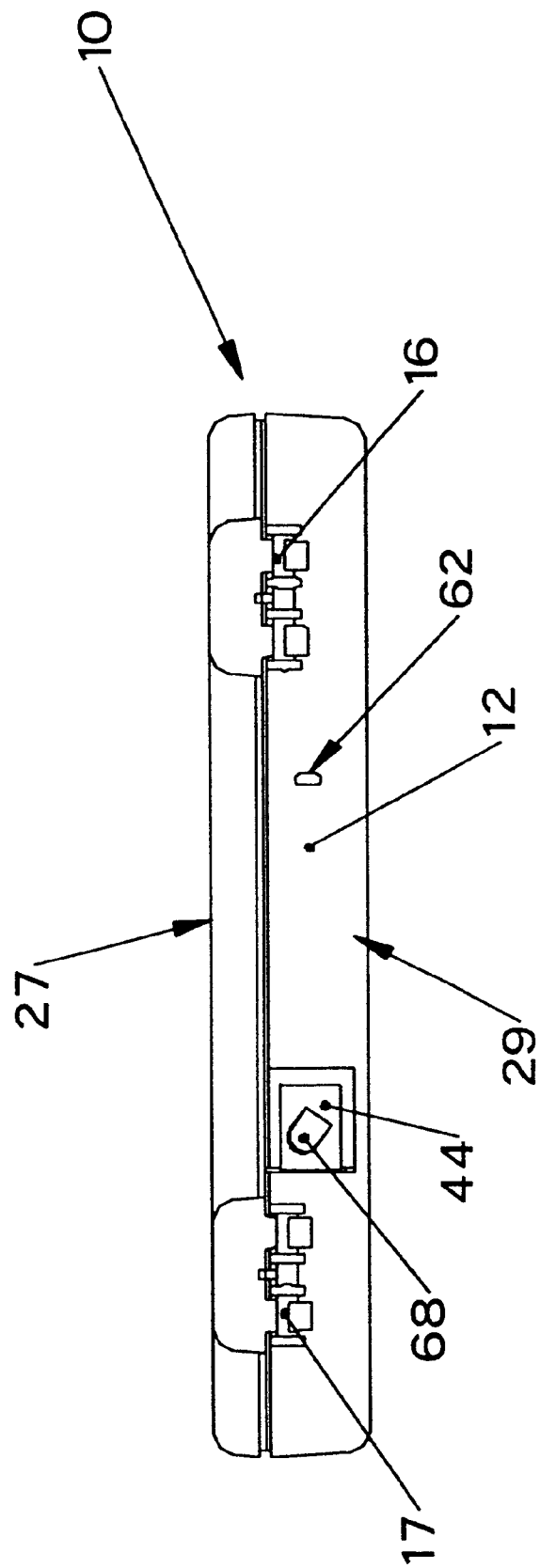
FIG. 4 is a rear elevational view of the storage compartment of FIG. 3 with the lid closed.
Figure 5:
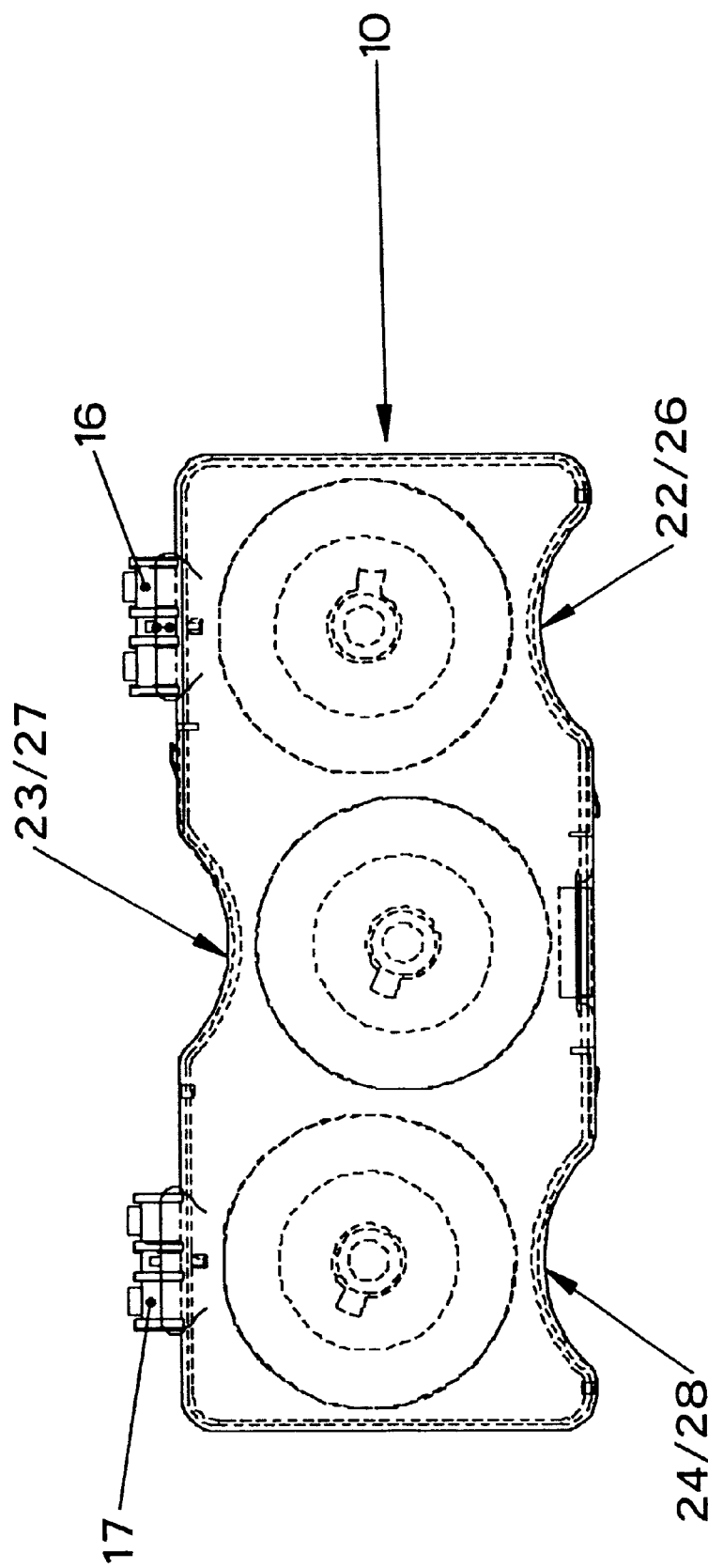
FIG. 5 is a top plan view of the storage compartment of FIG. 3 with the lid closed.
Figure 6:
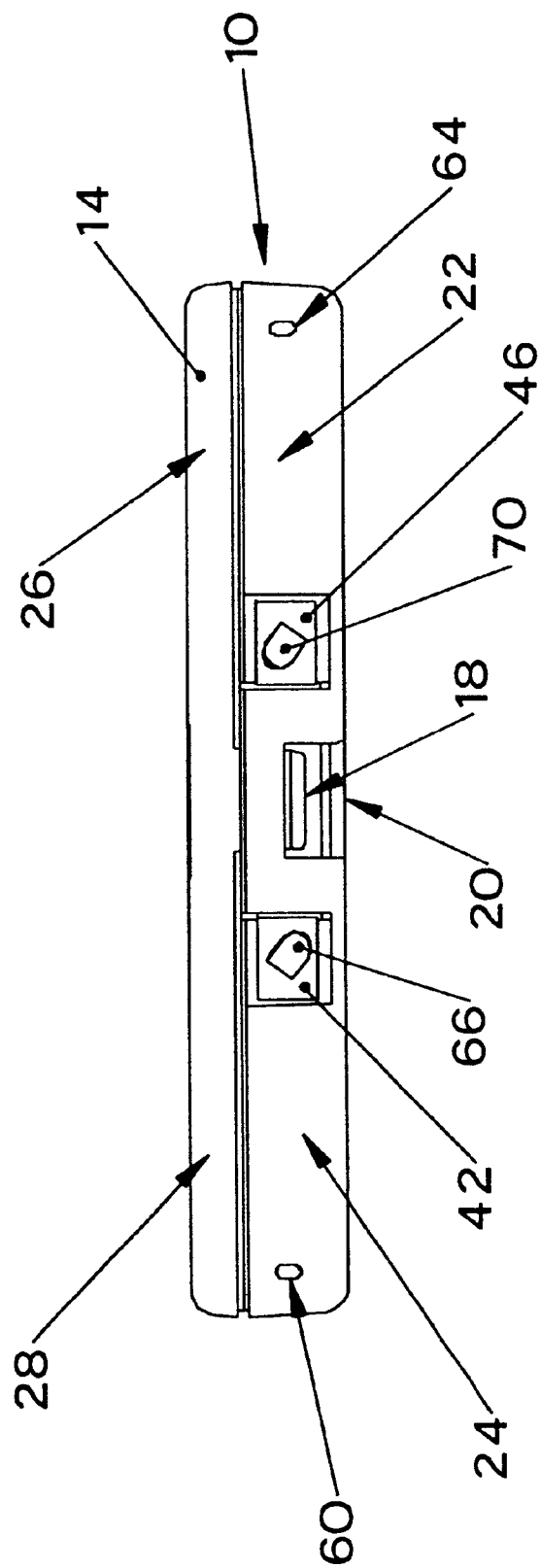
FIG. 6 is a front elevational view of the storage compartment of FIG. 3.
Figure 7:
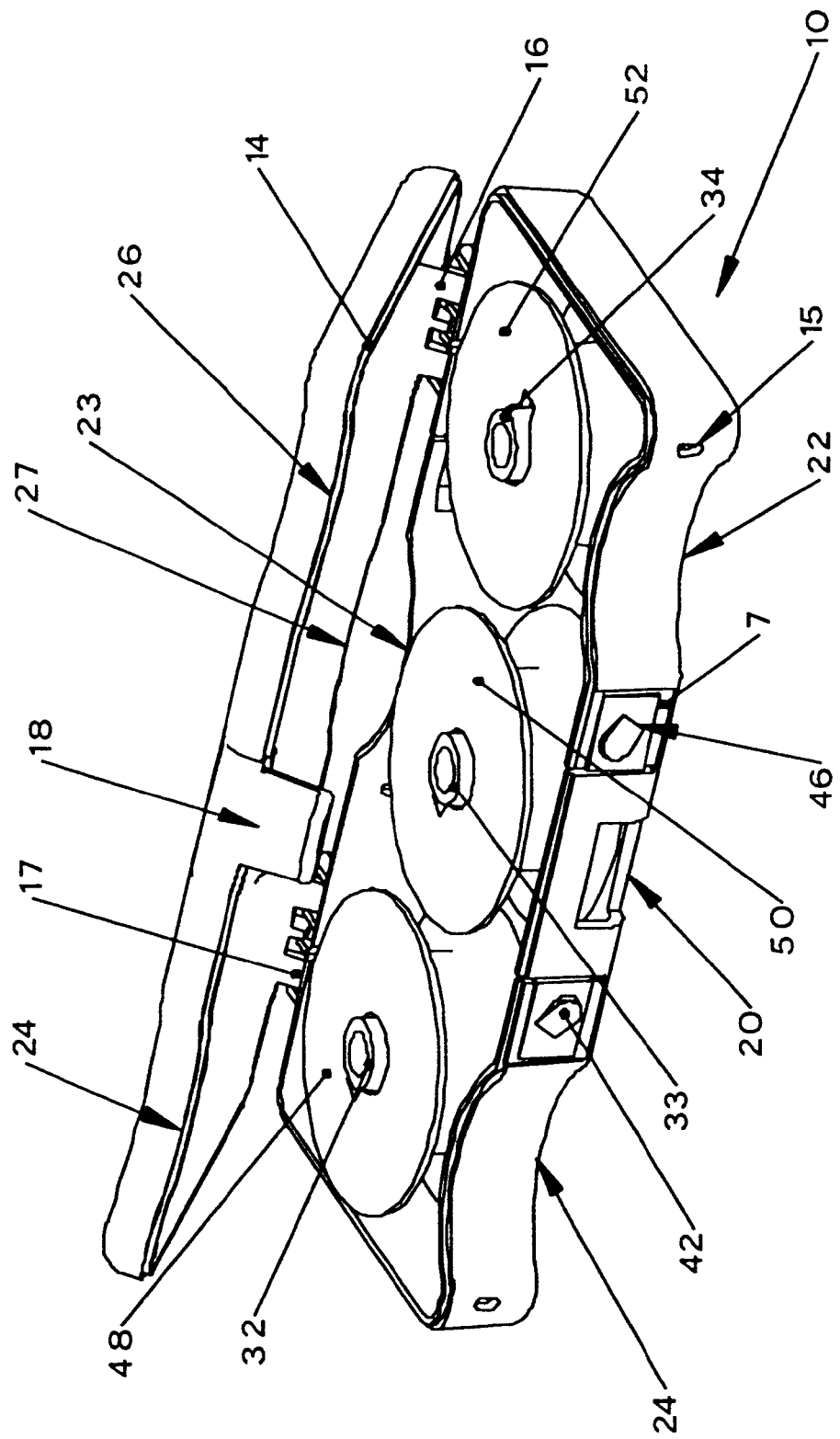
FIG. 7 is a front perspective view of the storage compartment of FIG. 2 with the lid partially open and without any tippet line.
Figure 8:
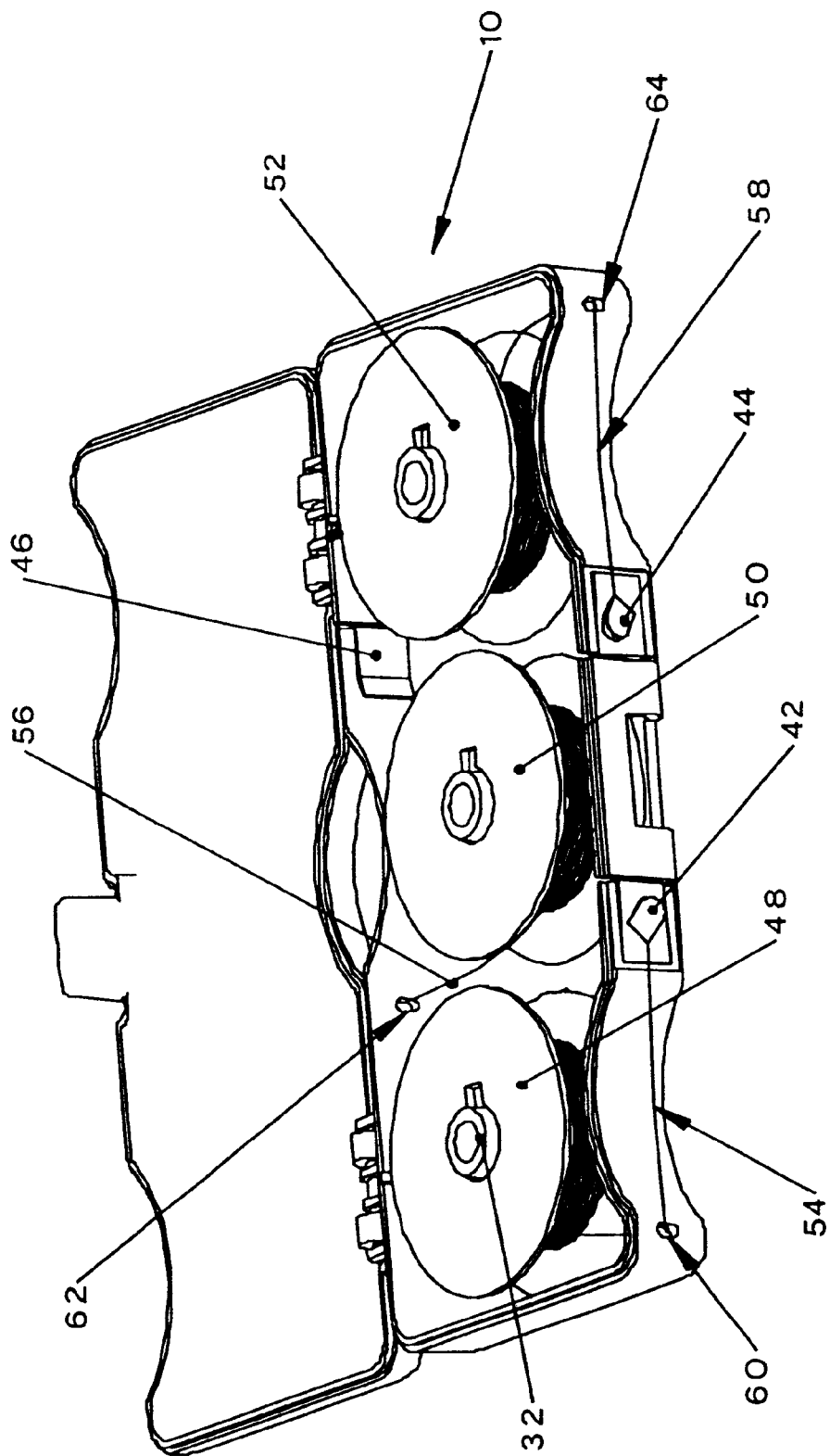
FIG. 8 is a front perspective view of the storage compartment of FIG. 3.

In one embodiment, the base 12 and lid 14 are preferably about 5 inches long and about 2 inches wide. When closed (as shown, for example, in FIG. 4), the container 10 is preferably about 0.75 inches thick. Of course, the dimensions of the container 10 may be widely varied depending upon the desired amount and variety of tippet material to be held within the container 10, and the available space for storage of the container 10.

In a preferred embodiment, the hinges 16, 17 each have two parts that are integrally formed as complimentary portions of the base 12 and the lid 14. However, the hinges may also be formed of entirely separate components, and could have various shapes and sizes to accommodate various design purposes. For example, the hinge may be a thin piece of flexible material between the base 12 and the lid 14, preferably formed integrally with the base 12 and lid 14 during the manufacturing process. Alternatively, the lid could also be formed as a substantially flat sheet that slides along grooves formed in the upper edges of the walls of the base to open or close the container.

All or part of the base 12 and/or the lid 14 may be formed of transparent material to permit the fisher to see the spools within the container 10. This viewing area preferably allows the fisher to see the weight and diameter of each tippet (which may, for example, be written on a sticker affixed to each spool, or otherwise marked on or adjacent to each spool), as well as to assess how much tippet line remains on a given spool. The tippet markings may also be written on the outside of the container.

When the base 12 and the lid 14 are brought together by the pivoting hinges 16, 17, a storage cavity is formed therein. The walls of the base 12 preferably include lower indentations 22, 23, 24, and the walls of the lid 14 also preferably include corresponding upper indentations 26, 27, 28. In the closed configuration of container 10, the upper and lower indentations 22–24, 26–28 correspond so that the walls of the closed container 10 have a plurality of indentations. Alternatively, the indentations may be formed in only one of the base 12 or the lid 14, or may be omitted entirely.

The lid 14 preferably includes a latch 18, and the base 12 has a corresponding catch 20. When the container 10 is closed, the latch 18 removably connects with the catch 20 to secure the base 12 to the lid 14. Alternatively, the base 12 and the lid 14 may be removably secured to each other by various other mechanisms such as magnets, interference fittings, turn latches, or similar means.

The lid 14 or base 12 also preferably includes a means for removably connecting the container 10 to the fisher's clothing. For example, there may be a loop integrally formed therein to receive a portion of a fisher's belt, or a clip to attach the container 10 to the fisher's pants or shirt, or a tether to pass around the fisher's neck.

In a preferred embodiment, three substantially cylindrical shafts 30, 32, 34 are attached to, and extend upwardly from, the base 12. As shown in FIG. 2, the shafts are preferably tapered. Of course, some or all of the shafts 30, 32, 34 could alternatively be connected to the lid 14 of the container rather than the base 12, and may be of any suitable shape.

In one embodiment, each shaft is preferably about 0.6 inches long. The base diameter of each shaft is preferably about 0.5 inches and the top diameter of each shaft is about 0.375 inches. For ease of manufacturing, the shafts 30, 32, 34 are preferably integrally molded with the base 12 or lid 14. Alternatively, the shafts could be formed as separate components and attached to the base with a screw, bolt, adhesive, or some other means.

The shafts are preferably axially separated from each other. It is advantageous to use axially separated shafts because the spools can be placed inside, and removably secured to, a container with diminished thickness that fits more easily within a fisher's pocket, tackle box, or belt. By contrast, when the spools are secured to co-linear shafts (or a single long shaft), the container must generally be rather thick or long in the direction of the axis of the shaft(s). Such a container would be more obtrusive and more difficult to carry and store.

As shown in FIGS. 3, 5, 7, and 8, three spools 48, 50, 52 are preferably placed within the container 10. Each of the spools 48, 50, 52 has a central hole with a diameter slightly larger than each of the shafts 30, 32, 34. The spools 48, 50, 52 are placed on the shafts 30, 32, 34 and independently rotate around the shafts 30, 32, 34. Alternatively, the spools may be attached to the shafts without rotating, or the shafts may rotate with respect to the base 12 and lid 14. The shafts 30, 32, 34 are separated from each other by a sufficient distance to accommodate the desired size of the spools 48, 50, 52 positioned within the container 10.

When the container 10 is opened, the spools 48, 50, 52 may preferably be removed from the shafts 30, 32, 34 because it is generally more convenient to refill or unwind the filament from the spools 48, 50, 52 when they are outside of the container. In addition, the container 10 and spools 48, 50, 52 may be appropriately sized and shaped to accommodate specific sizes of filament sold by manufacturers and inserted into the container 10 after purchase without any further preparation. If a desired type of tippet material is purchased on a spool that does not fit within the container 10, the tippet material must be wound around each of the spools 48, 50, 52. The spools are thereafter replaced within the container 10 by sliding them over a respective shaft.

As those of skill in the art would appreciate after reading this disclosure, there could be fewer or more than three shafts and spools depending upon the desired variety of filaments to be used and the storage space available. The relative size of the spools may also vary. When a certain type of filament is used more frequently than others, it may be advantageous to provide a larger spool for that filament.

Preferably, there are multiple access holes 60, 62, 64 formed in the walls of the base 12 or lid 14 depending on the location of the shafts. The free end of each length of filament, such as tippet 54, 56, 58, which is wound around its respective spool 48, 50, 52, extends away from the spool 48, 50, 52 and out of a corresponding access hole 60, 62, 64. Preferably a guiding means, such as a small, truncated cone-shaped tube may be provided on the interior side of one an access hole 60, 62, 64 to facilitate threading the filament through the hole. When the container 10 is closed, the spools 48, 50, 52 with the tippet 54, 56, 58 remain inside, but a fisher has convenient access to the end of the tippet through the access holes 60, 62, 64.

Figure 3:
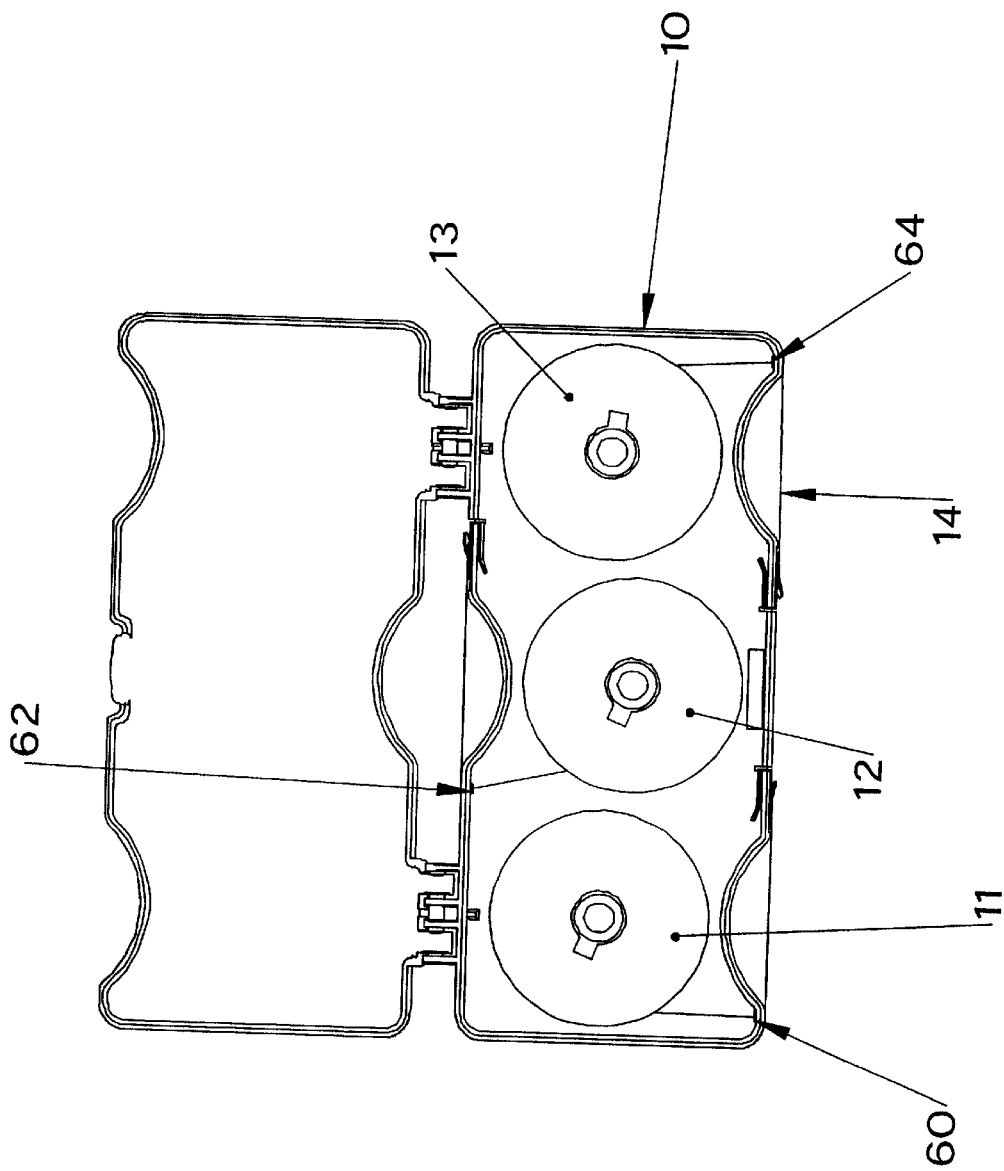
FIG. 3 is a top plan view of the container of FIG. 2 with spools of filament placed within the container.

The base 12 preferably includes a plurality of cutter areas, each of which is configured to receive a corresponding cutter 42, 44, 46, preferably made of stainless steel. As shown in FIGS. 1 and 3, each of the cutters 42, 44, 46 has a portion that presses against the inside wall of the base 12, another portion that extends through or around the cutter areas, and yet another portion that extends along the outside wall of the base 12. These inside and outside portions of the cutters 42, 44, 46 press against the corresponding cutter areas 36, 38, 40 and thereby attach to the wall of the base 12. As shown in the figures, the cutters may be positioned on the outside of the container. Alternatively, the cutters may be positioned within the container (and such a configuration may not require any access holes).

The tippet 54, 56, 58 extends from each spool 48, 50, 52 through an access hole 60, 62, 64, across an indentation 22, 23, 24, to a respective cutter 42, 44, 46. Each individual tippet 54, 56, 58 is pulled a desired distance beyond its respective access hole 60, 62, 64. To cut the tippet line, the fisher pulls the tippet tightly back across a sharp edge on the hook 66, 68, 70 to thereby cut it from the rest of the line. The end of the tippet line 54, 56, 58 preceding the cut portion remains on, and is held in place by, the hook 66, 68, 70 in the cutter 42, 44, 46.

When additional tippet material 54, 56, 58 is needed, the fisher can conveniently grasp it from where it extends across its respective indentation 22, 23, 24. The indentation permits the fisher to conveniently grasp the tippet line from the side of the container 10 without abutting his or her fingers against the sides of the container 10. Alternatively, the end of the tippet material 54, 56, 58 may be held at a point that protrudes outwardly from the wall of the container 10 for convenient grasping.

In other embodiments, the container 10 of the present invention may also be made of brightly colored or camouflage material, or it may have an especially buoyant and/or watertight configuration to help a fisher quickly recover it and minimize any damage or disarray of the contents if the container 10 is dropped into the water.

Thus, the present invention preferably provides a device and method for conveniently and compactly carrying an assortment of filaments such as fishing tippet lines of various weights and sizes, and for easily accessing and cutting the filaments. The present invention has been described herein through examples and preferred embodiments, but as those of skill in the art will appreciate after reading this disclosure, various alterations and modifications may be made without departing from the scope of the following claims:

What is claimed is:

1. A container for holding and dispensing at least three filaments, the container comprising:

a rectangular container body having a base with a bottom portion and a sidewall portion comprising first, second, third, and fourth sides, the base being pivotally attached to a lid with a top portion and a sidewall portion, the base and lid forming a cavity therebetween;

at least three axially separated shafts extending into said cavity, each of said shafts having approximately the same length;

the distance between the bottom portion of the base and the top portion of the lid being approximately equal to the length of the shafts;

at least three access holes comprising first, second, and third access holes extending through the sidewall of the container, each of the access holes being adapted to permit one of said filaments to pass therethrough, said first access holes being located on said first side of the container and said second and third access holes being located on said second side of the container which is opposite from the first side;

at least three indentations comprising first, second, and third indentations in the sidewall of the container, each of the indentations being proximal to one of said access holes, said first indentations being located on said first side of the container and said second and third indentations being located on said second side of the container which is opposite from the first side;

at least three cutters comprising first, second, and third cutters located on the container, each of said cutters being proximal to one of said access holes and one of said indentations and being adapted to cut and hold at least one of said filaments, said first cutter being located on said first side of the container and said second and third cutters being located on said second side of the container which is opposite from the first side; and wherein said first indentation is located between said first access hole and said first cutter, said second indentation is located between said second access hole and said second cutter, and said third indentation is located between said third access hole and said third cutter.

2. The container of claim 1, wherein at least a portion of the container lid is transparent to permit viewing the contents of the cavity.

3. The container of claim 1, further comprising spools adapted to be removable from the shafts.

4. The container of claim 3, wherein each of the spools is labeled with one or more letters to allow visual identification of a feature of a filament wound around the spools.

5. The container of claim 4, wherein the length of the container is at least about twice as large as the width of the container.

6. The container of claim 5, wherein the thickness of the container is substantially smaller than the width of the container.

* * * * *